Dec. 1, 1936. H. L. HOY Re. 20,186

CHANGE SPEED GEAR TRANSMISSION

Original Filed Jan. 12, 1929 8 Sheets-Sheet 1

Inventor
Harry L. Hoy
Daniel Brennan
Attorney

Dec. 1, 1936. H. L. HOY Re. 20,186

CHANGE SPEED GEAR TRANSMISSION

Original Filed Jan. 12, 1929 8 Sheets-Sheet 2

Inventor
Harry L. Hoy
Daniel J. Brennan
Attorney.

CHANGE SPEED GEAR TRANSMISSION

Original Filed Jan. 12, 1929 8 Sheets-Sheet 3

Inventor
Harry L. Hoy
Daniel J. Brennan
Attorney

Dec. 1, 1936. H. L. HOY Re. 20,186

CHANGE SPEED GEAR TRANSMISSION

Original Filed Jan. 12, 1929 8 Sheets-Sheet 4

Inventor
Harry L. Hoy
Daniel Z. Brennan
Attorney.

CHANGE SPEED GEAR TRANSMISSION

Original Filed Jan. 12, 1929 8 Sheets-Sheet 5

Inventor
Harry L. Hoy
Daniel G. Brennan
Attorney

Dec. 1, 1936. H. L. HOY Re. 20,186

CHANGE SPEED GEAR TRANSMISSION

Original Filed Jan. 12, 1929 8 Sheets-Sheet 6

Inventor
Harry L. Hoy
Daniel A. Brennan
Attorney

CHANGE SPEED GEAR TRANSMISSION

Original Filed Jan. 12, 1929 8 Sheets-Sheet 7

Inventor
Harry L. Hoy
Daniel B. Brennan
Attorney

Dec. 1, 1936. H. L. HOY Re. 20,186

CHANGE SPEED GEAR TRANSMISSION

Original Filed Jan. 12, 1929 8 Sheets-Sheet 8

Inventor
Harry L. Hoy
Daniel A. Brennan
Attorney

Reissued Dec. 1, 1936

Re. 20,186

UNITED STATES PATENT OFFICE 20,186

CHANGE SPEED GEAR TRANSMISSION

Harry L. Hoy, Chicago, Ill., assignor, by mesne assignments, to Vaco Products, Inc., Detroit, Mich., a corporation of Delaware Original No. 1,791,502, dated February 10, 1931, Serial No. 332,048, January 12, 1929. Application for reissue May 25, 1936, Serial No. 81,692

23 Claims. (Cl. 74—336.5)

The present invention relates to improvements in change speed gear transmissions having means associated therewith whereby the selection of speed gears in motor driven vehicles may be automatically controlled by the operator.

It is an object of the invention to provide change speed gear transmissions with shiftable sets of gears of the customary or any desired arrangement, adapted to assume different relations to each other and to non-shiftable gears upon variations in the speed of the driven shaft. The alteration between the relation of the sets of shiftable gears, however, is automatically controlled by the operator, such controlling element being within easy reach.

Another object of the invention is to provide a change speed gear transmission in which the manipulation of the clutch pedal, for disengaging the clutch of the vehicle, automatically effects the selection of gears, a vacuum, oil, or electricity being employed as the medium for accomplishing this end.

Another object of the invention is to provide automatic means for lubricating the operable members of the change speed gear operating mechanism.

The foregoing and such other objects as will appear hereinafter as the description proceeds will be more readily understood from a perusal of the following specification, reference being had to the accompanying drawings, in which:—

In the preferred form of the invention, shown in Figures 1 to 14, means are provided whereby the vacuum created in the intake manifold of a gasoline engine is utilized to actuate the gears mounted in the transmission of an automobile. While various types of transmission may be employed, it is highly desirable that this be of a type having slidable gears therein.

Figure 12:
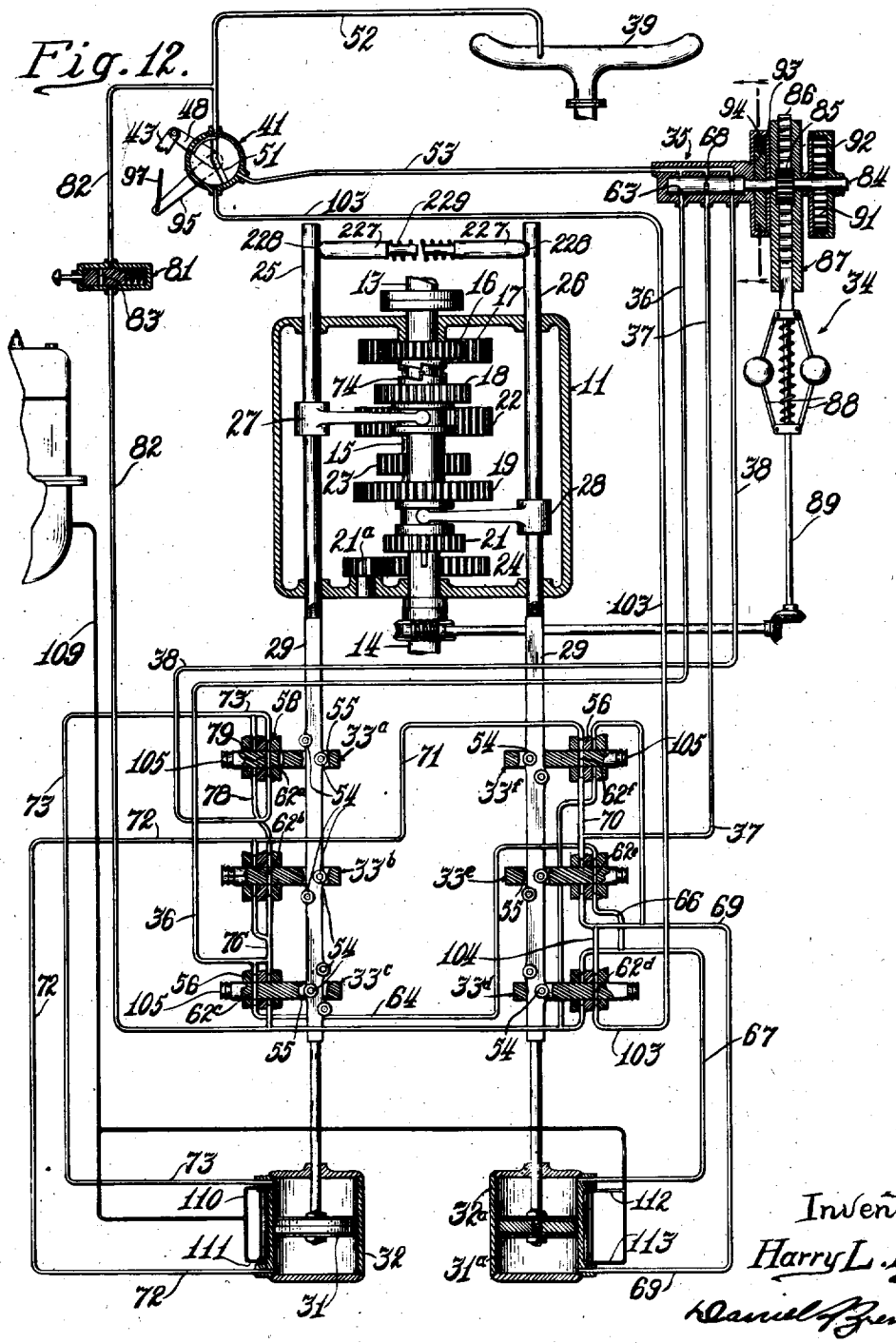
Figure 12 is a general view showing the arrangement of the various valves together with a diagrammatic view of the transmission assembly.
Figure 15:
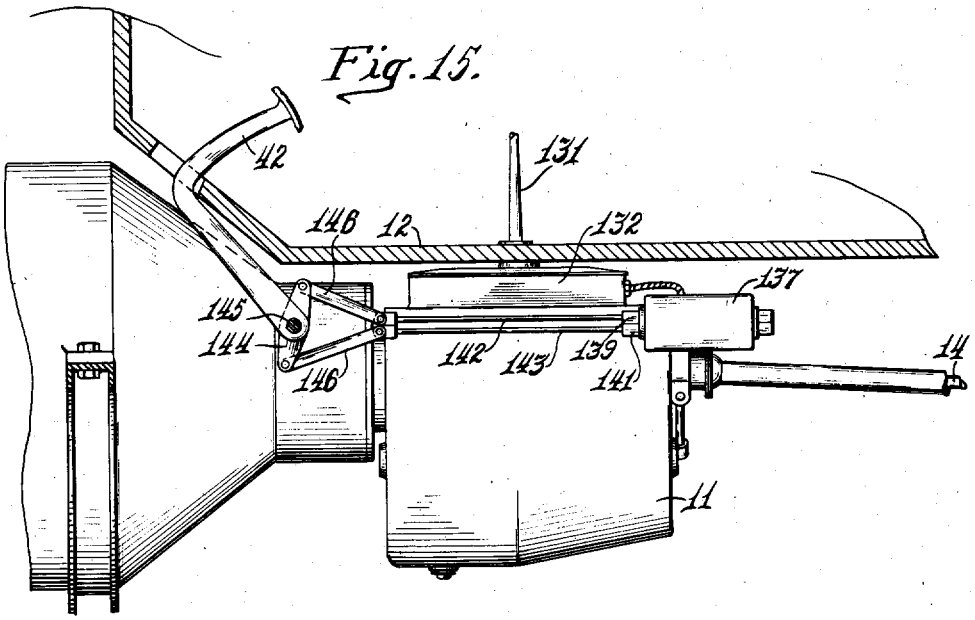
Figure 15 is a view similar to Fig. 1, showing a modified form of the invention, wherein an electrical means is employed to effect the shifting of the gears.
Figure 16:
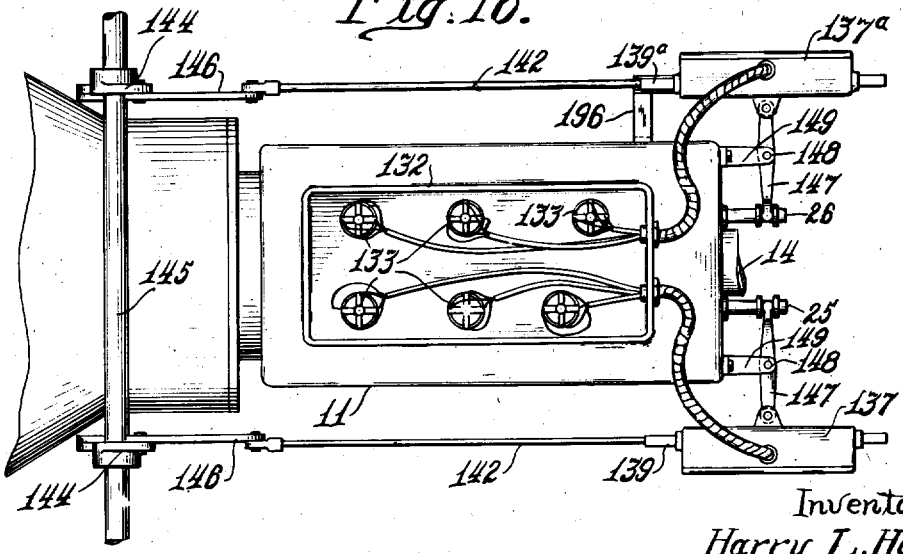
Figure 16 is a plan view of the device shown in Fig. 15, with the cover of the switch box removed.
Figure 17:
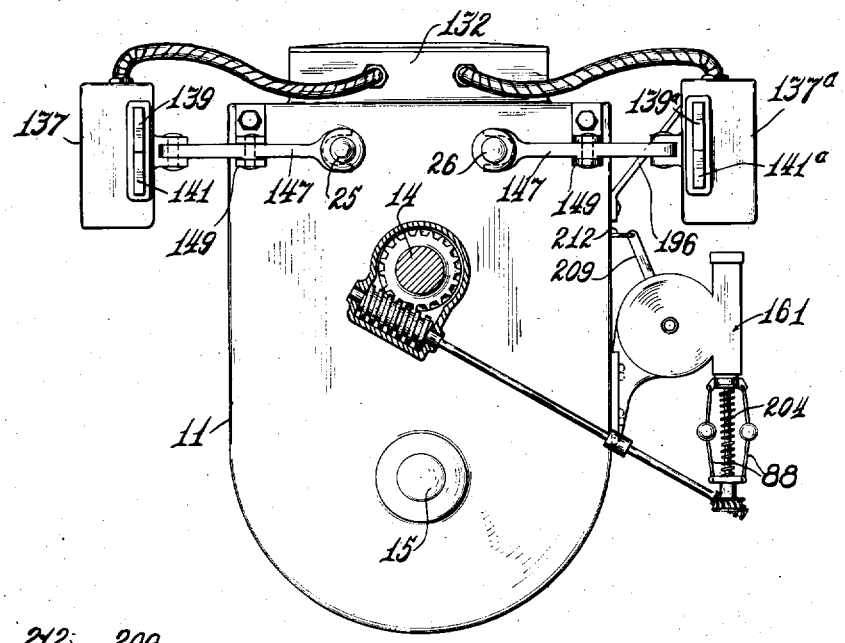
Figure 17 is an end elevational view of the gear shifting mechanism shown in Fig. 15.

The transmission gear casing 11 is disposed below the floor boards 12 of an automobile in the usual manner and receives, as shown in Fig. 12, the ordinary gear transmission permitting of three gear changes forward, one reverse and two neutral. The details of the change speed gear transmission, which are shown in this figure in their neutral position, may be of ordinary construction. The engine shaft 13 is shown in alignment with the driven shaft 14, with which it may be operatively connected either directly or through a counter shaft 15 driven from the engine shaft through the gears 16 and 17. The shiftable gears are indicated at 18, 19 and 21; the gear 18 being movable to clutch engagement with the engine shaft 13 (high speed), or to engagement with the gear 22 on the counter shaft 15 (second speed), while the gears 19 and 21 may be shifted simultaneously so that gear 19 will engage gear 23 on the counter shaft 15 (low speed), or when shifted in the opposite direction, gear 21 will drive the reverse gear 24 through idle gear 21*a*.

Shift bars 25 and 26, carrying shifting arms 27 and 28 respectively, project through bearings in the casing 11 and are each provided on their rearward projecting end with an extension preferably in the form of a flat bar 29. Each of these flat bars 29 has mounted on its end a piston 31 reciprocably mounted in a cylinder 32 which is secured, by a bracket to the under side of the floor board 12 of the automobile. Novel means, to be described in detail later, are provided whereby the vacuum of the engine actuates the piston 31 or 31*a* to move them in either direction, to reciprocate the shift rods 25 and 26, and move the shiftable gears into engagement with their respective co-operating gears on the counter shaft.

It can readily be seen in Fig. 12, that when the piston 31 moves forwardly towards the transmission housing 11, the gear 18 is moved into clutch engagement with the gear 16. When the piston 31 is moved rearwardly, or in the opposite direction, the gear 18 engages the gear 22 on the counter shaft 15. Movement of the piston 31*a* forwardly towards the transmission carries the gear 19 into engagement with the gear 23. Upon movement of the piston 31*a* in the reverse direction gear 21 slidably mounted on the shaft 14 engages the reverse gear 24 through the idler 21*a*, thereby rotating said driven shaft in reverse direction.

The selection of the desired piston and the direction in which it is to be moved is obtained in part by the provision of a plurality of selector valves 33 operably associated with the flat bar extensions 29 of the shift rods 25 and 26. The plurality of selector valves 33 are of such construction and are so interconnected with piping that respective passages therethrough are opened or closed upon variance of the position of the gearing in the transmission, and upon the relative speed of the driven shaft.

The means for effecting the movement of these pistons is controlled primarily by the driven shaft 14, as aforementioned, and through a governor 34 operatively connected therewith, said governor operating a valve 35 mounted thereon which is adapted to place one of the vacuum lines 36, 37 or 38 connecting with the plurality of selector valves, into communication with the vacuum or negative pressure of the motor, the negative pressure passing through the line selected to the proper selector valve 33 and into one of the cylinders 32. The main vacuum line leading from the intake manifold 39, of the motor, to the governor 34 is normally closed by a master valve 41 inserted therein. This master valve is operatively connected with the clutch pedal 42, whereby, upon depression thereof, said valve is opened. It is obvious, therefore, that upon depression of the clutch pedal 42, the master valve 41 is opened and the negative pressure is free to pass through one of the pipe lines 36, 37, or 38 as determined by the governor valve 35, into one or more of the valves 33 and into one or the other of the cylinders 32 or 32*a* drawing the piston therein in the desired direction, thus selecting the gear to be shifted to drive the driven shaft 14 at the desired speed.

To provide for the automatic operation of the master valve 41, through actuation of the clutch pedal 42, a lever arm 43 is pivotally mounted on a bracket 44 preferably secured to the valve housing. One arm 45, of the lever 43, extends toward the clutch pedal and has pivotally mounted on its end an extension 46, which is adapted to extend into the path of a pin 47 mounted on said clutch pedal.

When the clutch pedal is depressed, the pin 47 engages the extension 46 rocking the lever arm 43 and, as said lever arm is pivotally connected with an arm 48, disengageably mounted on the valve stem 49, the port 51 of the valve 41 is moved into communication with the main vacuum line 52 and the line 53 leading to the governor valve 35. Further depression of the clutch pedal permits the extension 46 to become disengaged from the pin 47 and the lever arm 43 moves back to its normal position due to the spring 50 acting thereon, thereby closing the valve 41. Upon the return movement of the clutch pedal 42, the pin 47 moves freely past the extension 46 without actuating the valve.

Means for actuating the selector valves 33 for partly determining which gear is to be shifted is provided for on the flat bar extensions 29 of the shift rods. This means comprises a plurality of rollers 54, mounted on said extension 29 at intervals and arranged on either side thereof. When either of the shift bars 25 or 26 are moved in one direction or the other, these rollers engage the ends of slots 55 provided therefor in the stem of each of the selector valves 33, causing the latter to move laterally within their common housing 56, thereby changing the direction of the vacuum.

The valve housing 56 preferably is formed of a built up structure comprising a pair of outside plates 57 and an intermediate plate 58, which are bolted or otherwise secured together to form a unitary structure. Aligned apertures 59 are provided in these plates into which the selector valves 33 are reciprocably mounted. Passages or ports, communicating with the various valves and valve openings, are preferably formed by grooving the inside faces of the two outside plates 57. This provides two independent groups of passageways in the housing 56, portions of which communicate with each other through ports 61, in the intermediate plate 58, which ports align with the various passages in the outside plates. It can, therefore, be readily understood that with the various selector valves 33 in their lowermost positions, the ports 62 provided therein communicate with the lower sets of passageways in the housing 56.

When the selector valves are moved into communication with the upper sets of passageways, by the shifting of the flat bar extensions 29 and the shift rods 25 or 26, an entirely different set of passageways is placed into communication with the vacuum line. It is by means of these valves that partial selection of the various gears to be shifted is automatically effected.

It is to be understood that all of the passageways in the valve housing 56 are not in permanent communication with the vacuum line 52 when the master valve 41 is opened. The selection of the passageways is determined by the governor 34, which governor is controlled by the speed of the driven shaft through gears operatively connecting it therewith. The operation of the novel automatic vacuum actuated gear shifting mechanism will be more readily understood from the following:

Assuming that the vehicle is standing idle and the driver thereof is desirous of starting, the motor thereof is started up thereby creating a vacuum in the intake manifold 39. Upon partial depression of the clutch pedal 42, the master valve 41 is automatically opened (see Fig. 12) placing the vacuum lines 52 and 53 into communication with each other; and the governor controlled valve 35 now has one port 63 thereof in communication with the pipe line 36. This pipe line is in communication with one of the passages in the valve housing 56 leading to the upper portion of the reciprocating selector valve 33*e* which is in open position, thereby permitting the vacuum to operate through the pipe line 64, which also communicates with the vacuum lines 66 and 67 leading into the forward end of the cylinder 32*a* through the port 62*e* in the valve 33*e*. The vacuum acting on the piston 31*a* in the cylinder 32*a*, draws said piston forward moving the low speed gear 19 into operative engagement with the gear 23 on the counter shaft 15. The gearing of the transmission is now in first speed position. When the shift rod 26 moves forward, the rollers 54 carried on the shift rod extension 29 actuate the selector valves 33*e*, 33*f*, to move their ports 62*e*, and 62*f* respectively, into communication with the upper or lower passages, respectively in the valve housing 56.

As the speed of the vehicle increases, the operator again depresses the clutch pedal 42 moving the master valve into open position once more. However, due to the increase in the speed of the vehicle, the governor 34 will have been actuated to move the rotatable valve 35, controlled thereby, to a position where the port 68 therein aligns with the second speed pipe line 37, and the port 63 moved out of engagement with the first speed pipe line 36. This creates a vacuum in the line 37, the port 62*e*, of the valve 33*e*, which is now in communication with line 37. A vacuum is also created in the cylinder 32*a*, through pipe line 69, thereby causing piston 31*a* to move rearwardly, moving the gear 19 out of mesh with the gear 23. The resulting movement of the extension 29 causes the valve 33 to again move to its original position, due to its operative engagement therewith, cutting off the pipe line 69 to prevent the piston 31*a* from moving the entire length of the cylinder. The second speed pipe line 37 also communicates with the valve 33*f* through a pipe 70, which permits a vacuum to be created on the rear side of the piston 31, through conduits 71 and 72. This causes the piston 31 to be moved rearwardly, thereby moving the second speed gear 18 into mesh with gear 22 mounted on the counter shaft 15. The transmission is now positioned for driving in second speed.

As the vehicle continues to increase in speed, the operator again depresses the clutch pedal placing the pipe line 53 into communication with the intake manifold 39, and, as the governor 34 is now in position to permit communication with the third speed vacuum line 38, said vacuum actuates therethrough, through the aligned port 62*a*, in the selector valve 33*a*, pipe line 73 and into the forward end of the cylinder 32, upon the forward side of the piston 31. This movement slides the gear 18 out of mesh with the gear 22, and the clutch teeth 74 carried on the gear 18 engage the clutch portion of the gear 16. The vehicle is now positioned for driving in high speed by direct connection with the drive shaft 13. It is to be understood that each time the clutch pedal 42 is depressed, the port 51 of the master valve 41, controlled thereby, is moved into communication with the passage 53, and upon nearing the completion of the downward stroke said valve automatically closes, thereby cutting off the vacuum in the cylinders 32 and 32*a*.

Should the operator, when driving at high speed be forced to slow down, due to traffic or other reasons necessitating a slower speed, the governor retraces its movement, moving the valve 35, respectively into communication with the second speed pipe line 37 or the first speed passage 36. When the governor valve 35 is moved back into second speed, the path of the vacuum upon depression of the clutch pedal is as follows: through the main vacuum line 52, port 51, line 53, through the governor valve 35 to the passage 37, by pass 70, port 62*f*, through pipe line 71 and into passage 72, thereby moving the piston 31 rearwardly and sliding the gear 18 into mesh with the second speed gear 22 as before. As the speed of the vehicle continues to decrease, the first speed port 63 of the governor valve 35 is again placed into communication with the vacuum line 36. The line of passage is now through this port 63, vacuum line 36, and as the selector valve 33*c* is ineffective due to closing of the passages communicating thereinto the vacuum continues through by passage 76, port 62*b* which has remained open, by passage 78 and into passage 73 through port 62*a* which now connects the two, and into the cylinder 32 and moves the piston 31 forward to slide the gear 18 into neutral position. When this gear is in neutral the rollers 54 actuating on the valves 33*a* and 33*c* the position of the ports therein, thereby permitting the vacuum to continue from line 36 through port 62*c* into line 64 thence through the port 62*e* to passages 66 and 67 to move the piston 31*a* forward placing the gear 19 into operative engagement with the gear 23 for driving in low speed.

In bringing the vehicle to a complete stop, it is desirable that the gears be automatically returned to their neutral position. This is effected by depressing the clutch pedal 42 to its extreme downward limit, to actuate a neutral valve 81 which is positioned to have operative engagement therewith, thus placing the vacuum line 52 into direct communication with a neutral pipe line 82 through the port 83 in the valve 81, which actuates, through the respective selector valves 33 whereupon the piston, controlling whichever gear is in mesh, is moved to bring said gear out of mesh. The selection of the particular gear to be moved into neutral upon bringing the vehicle to a stop is effected by the relative position of the various valves 33, which are automatically positioned by the actuation of the rollers 54 on the extensions 29 of the shift rods.

Inasmuch as the various valves, operated by the governor or clutch pedal, control the vacuum line, it is necessary that the ports therein open or close in as short a period as possible to connect the various pipe lines communicating therewith. To this end, with reference to the rotatable valve 35, controlled by the governor 34, it will be understood that speed of the governor gradually increases as the vehicle gains motion. This would, under normal conditions, effect a gradual rotation of said valve, which would tend to gradually open or close the various ports controlled thereby. To provide for immediate closing and opening of the port therein, a resilient means is provided for retaining the valve 35 in a predetermined position until the governor has reached a speed sufficient to actuate said valve quickly. This means is provided for on the long shaft 84 which extends from the valve 63. Fixedly mounted on this shaft is a gear 85 adapted to mesh with a rack bar 86 mounted for reciprocation in the housing 87. As the speed of the vehicle increases, the rack bar 86 is raised due to the spreading of the centrifugally operated governor control arms 88 operable by the rotation of the shaft 89 which is operatively connected to and positively driven by the driven shaft 14.

To prevent the immediate gradual rotation of the rotary valve 35, a spring 91 is rigidly secured to the shaft 84, which has its outer end secured to the housing 92 mounted thereover. This spring 91 is adapted to counteract the effort to rotate the gear 85 by the rack bar 86 upon the spreading of the centrifugally operated governor control arms 88 when the governor is being driven. When considerable resistance is offered by the governor the resistance of the spring 91 is overcome permitting the shaft 84 to rotate. The amount of this rotation, however, must be limited, inasmuch as the ports in the rotary valve member must positively align with the various pipe lines communicating therewith. To assure this alignment, a disk 93 is secured to the shaft 84, within the housing 87 of the governor, having a resiliently mounted ball 94 arranged in the periphery thereof adapted to engage in one of a plurality of recesses 95 provided therefor on the inside periphery of the wall of said housing. It will, therefore, be readily seen that upon rotation of the shaft 84 the ball 94 in engaging one of said recesses checks the rotation of the disk, holding the shaft 84 in immovable position until the resistance offered the spring 91 again becomes great enough to overcome same, and rotate the disk until the ball 94 engages the shoulder of the adjoining recess 95' wherein it is retained until the governor is again capable of overcoming the resistance offered by the spring 91.

As mentioned previously, the clutch control arm 48 on the master valve 41 is disengageably secured to the valve stem 49. This arrangement is provided to permit adjustment of said valve whereby upon depression of the pedal 42, the transmission gearing may be automatically moved into reverse.

To permit the operator of the vehicle to have ready accessibility to said valve for adjusting same, a second lever arm 96 is rigidly secured to the valve stem 49. This second lever arm is operatively connected to a manually operable lever 96 mounted on the dashboard by a rigid link 97.

Referring to Figures 5 to 8, inclusive, it can readily be seen that upon depression of the clutch pedal 42 the lever arm 48 may readily be rotated, rotating the valve 41. This movement is accomplished by providing a plurality of yieldingly mounted balls 98, or a similar clutch arrangement, between the hub portion 99, of the dash operated lever 95, which balls are adapted to engage in recesses 101 in the hub 102 of the clutch controlled lever arm 48, whereby, any movement imparted to the clutch controlled lever 48 is transmitted to the stem 49, through the dash controlled lever 95. It is preferable that a marker, or other similar means of indication, be mounted on the dashboard, having markings thereon to indicate the respective positions of the rotary valve member for obtaining communication with the forward and reverse lines connecting therewith.

Figure 9:
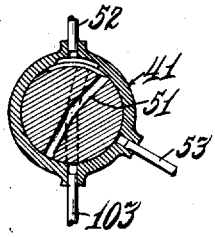
Figure 9 is a central sectional view through the master valve showing it in its reverse position, taken on line 9—9 of Fig. 5.

Under normal operating conditions, this manually operable lever 96 is set at the position marked "Forward" on the dash, which permits the port 51 to connect the pipe lines 52 and 53 when the valve is rotated. Upon moving the dash lever 96 to the point marked "Reverse", the lever arm 95 of the valve 41 will be moved, thereby rotating the valve member and placing the port 51 in position to communicate with the ports 52 and 103 as shown in Fig. 9.

However, due to the rigid connection between the clutch controlled lever 48 and the lever arm 43, the position of the former is not readily changed, therefore, the provision of the disengageable means between the clutch controlled lever 48 and dash operated lever 95 permits the latter to be moved without effecting the position of the clutch controlled lever 48, the yielding balls 98 thereof engaging in the recesses 101'.

With the master valve in this position, the clutch lever 42 is again depressed, actuating said valve as before moving the port 51 therein into communication with the vacuum line 52, leading from the vacuum source, and the reverse passage 103. This passage communicates with the upper passage in the valve housing 56 leading to the selector valve 33*d*, through port 62*d* therein, by pass 104, and into pipe line 69 to the rear side of the piston 31*a*, moving same rearwardly and sliding the gear 21 into mesh with the idler 24, mounted for operative engagement with the gear 21*a*, carried on the counter shaft 15.

To return the gears to neutral position, as for example, from reverse, the clutch pedal 42 is fully depressed to actuate the neutral valve 81, permitting the vacuum to actuate through the neutral line 82 to the lower side of the valve 33*d*. This valve is now in detented position thereby opening for communication with the neutral line 82, through port 62*d*, the line 67 and the forward end of the cylinder 32*a*. The piston 31*a* therein then moves forward drawing the gear 21 into neutral position. Upon reaching this neutral positon, the valve 33d will be moved outwardly cutting off the passage 67 from the vacuum, thereby preventing additional movement of the shifting rod 26 which would tend to move gear 19 into mesh with gear 23.

In most transmissions of the common type, the shift rods 25 and 26 are provided with an interlocking arrangement whereby only one rod can be shifted at a time. That is, when the gears are in second or high speed, the low and reverse gears cannot be shifted. This is usually provided for by a pair of plungers 227, having their rounded ends normally extending into notches 228 provided therefor in the shift rods 25 and 26 the spring 229 maintaining them therein. When either one of the rods 25 or 26 is shifted the ends on the plungers 227 abut and the unmoved shift rod is securely held against displacement until the notch 228 of the other rod is in alignment to receive the plunger. This construction serves to check the inertia of the shifting rods when neutral is desired and especially when changing over from one shift rod to the other as when going from first speed to second or vice-versa.

As mentioned heretofore, when using a vacuum or an oil system wherein valves are utilized to complete the passage through various parts therein, the valves must be actuated quickly to complete the opening or closing of the ports therein in as short a time as possible. To effect this, the selector valves 33 are each provided with an extension 105 which has formed thereon a plurality of notches or recesses 106, which recesses are adapted to receive therein a spring pressed ball or retaining member 107, resiliently mounted in a housing 108 secured to the upper side of the valve housing 56. When said valves are moved into their detented position the ball 107 will, upon reaching the recesses 106, cause the valve to be quickly forced into its lower position. However, it is to be understood that various other methods may be employed whereby these valves may be positively actuated to insure full opening or closing of the ports in the least possible time.

When employing a vacuum, it is essential that means be provided to prevent leakage at the valves, ports, and various other points in the system, wherein such leakage might occur. In this form of the device oil vapor formed within the crank case of a gasoline engine is utilized to seal any possible openings. With this in mind, an oil vapor line 109 is provided which communicates with the various cylinders 32. However, if this oil vapor line is left in communication with the vacuum system continuously, the vacuum created in said system will be destroyed. Therefore, automatic means is provided whereby only predetermined passages leading from the main oil vapor line 109 to the vacuum system are opened at one time, said passages or ports also permitting air to enter the system when opened.

Figure 1:
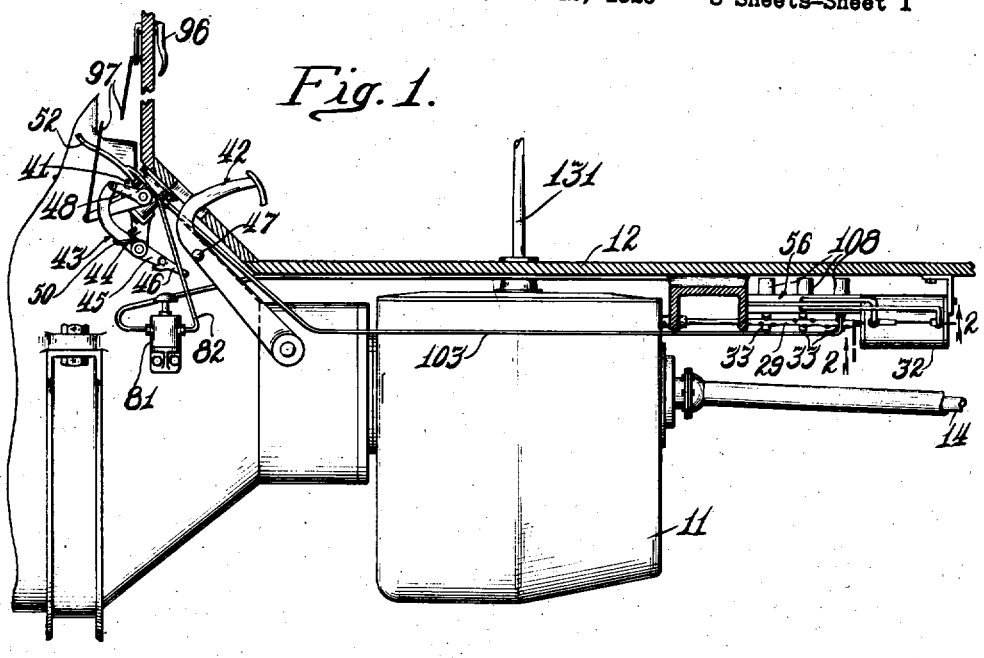
Figure 1 is a side elevational view of the gear casing showing the clutch pedal and various operating parts in their respective positions thereto.
Figure 2:
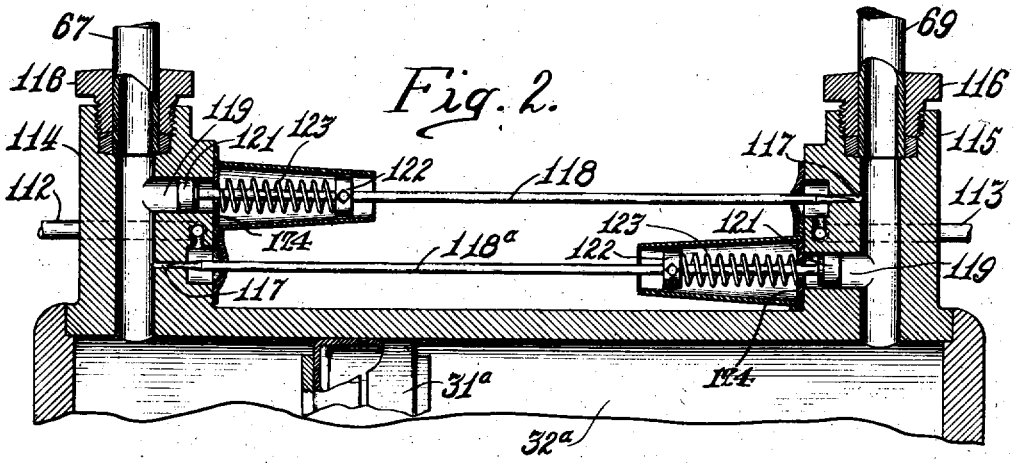
Figure 2 is an enlarged detail sectional view through a portion of one of the gear shift rod actuating pistons, showing the oil vapor lubricating control means.
Figure 4:
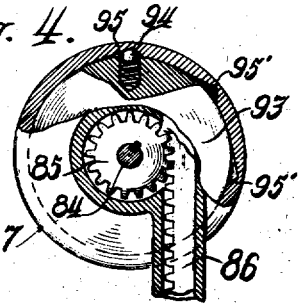
Figure 4 is a fragmental sectional elevational view through a portion of the speed governor, showing parts thereof broken away to show the arrangement of parts mounted therein.
Figure 3:
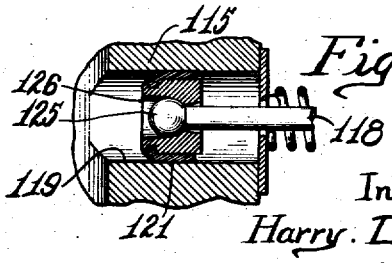
Figure 3 is an enlarged detail sectional view through one of the oil vapor control valve operating plungers.
Figure 5:
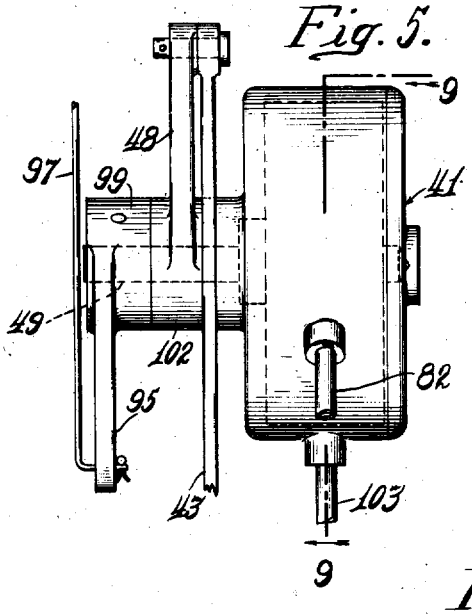
Figure 5 is a side elevational view of the master valve.
Figure 6:
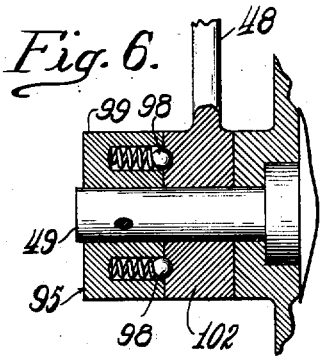
Figure 6 is a detail sectional view through the master valve operating levers, showing the disengageable clutch used in connection therewith.
Figure 7:
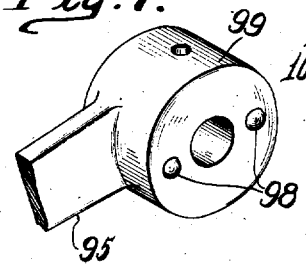
Figure 7 is a detail perspective view of the hub portion of the dash control lever.
Figure 8:
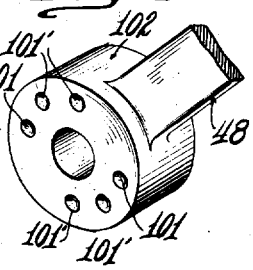
Figure 8 is a similar perspective view of a portion of the clutch controlled lever.

To provide for the automatic opening and closing of the air and oil vapor inlets, provided as indicated at 110, 111, 112, and 113, adjacent each end of the cylinders 32 and 32a, a plurality of spring controlled plunger actuated valves are provided which function to place the vapor lines and the atmosphere into communication with the vacuum lines leading thereto. Inasmuch as the arrangement of the oil vapor and the vacuum inlets is the same for each of the cylinders 32 and 32a only one such arrangement need be described, and as shown in Fig. 2, a portion of the cylinder 32a showing the valve arrangement is detailed. Bosses 114 and 115 are provided adjacent each end of the cylinder 32a into which is secured, by a packing nut 116, the vacuum lines 67 and 69 respectively. Communicating with the passage provided for the vacuum inlet in each of the bosses 114 and 115 is a relatively small port 117, each port having a seat thereon for receiving the tapered end of a valve stem 118, which normally closes the same. Each of the vapor oil lines 112 and 113 communicates with these valve members so that, when the latter are opened the oil vapor therein is drawn into the cylinders together with air from the atmosphere.

The valve stems 118 are oppositely disposed, and each carries on its free end a plunger 121, which is slidingly mounted in a bore 119, provided therefor, in each of the bosses 114 and 115. A collar 122 is securely mounted on each of the plunger shafts 118 and a compression spring 123 is adapted to be interposed between this collar and a washer 124, which washer abuts the plunger opening in the boss. The springs normally tend to keep the tapered ends of the valve stems 118 in engagement with each of the ports 117 in each of the bosses. The operation of these valves is such that when a vacuum is created in, for example, the conduit 67, the plunger 121 is drawn inwardly against the action of the spring 123, to open the valve port 117, and permit oil vapor and air to be drawn into the rear end of the cylinder as the piston 31a moves forward.

When a vacuum is created in the vacuum line 69, a similar action takes place with regard to the valve 118a the plunger 121 thereof moving towards the oil vapor passage in boss 117, permitting oil vapor to enter the forward end of the cylinder through the vapor oil line 112. The oil vapor which passes into the cylinders passes into various parts of the vacuum system thereby thoroughly lubricating the plurality of selector valves 33, the neutral valve 81, and the clutch operated master valve 41. The thin film of oil thus deposited on the various movable parts of the valves prevents leakage, thereby increasing the efficiency of the vacuum operated automatic gear shifting mechanism.

To allow for any variation in the alignment of the ports 117 with the relatively large plunger chambers 119 in the bosses 114 and 115, the plungers 121 are mounted on the valve stems 118 in such a manner that said valve stems are free to flex relative to the plungers. This means is provided for by a relatively ball shaped end 125 on each of the valve stems 118 which is adapted to freely rest in a recess 126 provided therefor in the plunger body 121. This construction is clearly illustrated in the enlarged detail shown in Fig. 3 of the drawings.

Although a vacuum is possibly the most satisfactory medium to use for operating the present automatic gear shift mechanism, oil or air pressure, obtained from any suitable source may be utilized with good results. In this event, the various arrangements of parts and the general hook-up of the conduits and valves is substantially the same as that employed in the vacuum system, the difference residing in the hook-up of the cylinders 32 and 32a.

Figure 14:
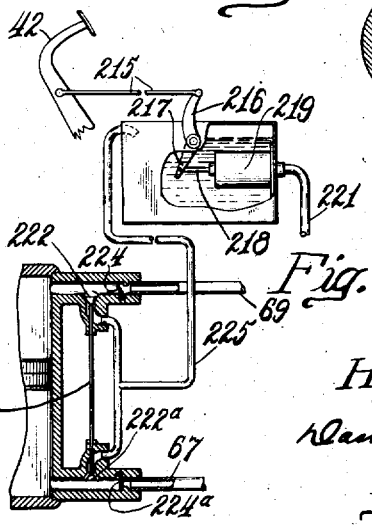
Figure 14 is a fragmental diagrammatic view of the valves and the means for obtaining the pressure for operating the device as hooked up in Figure 13.
Figure 10:
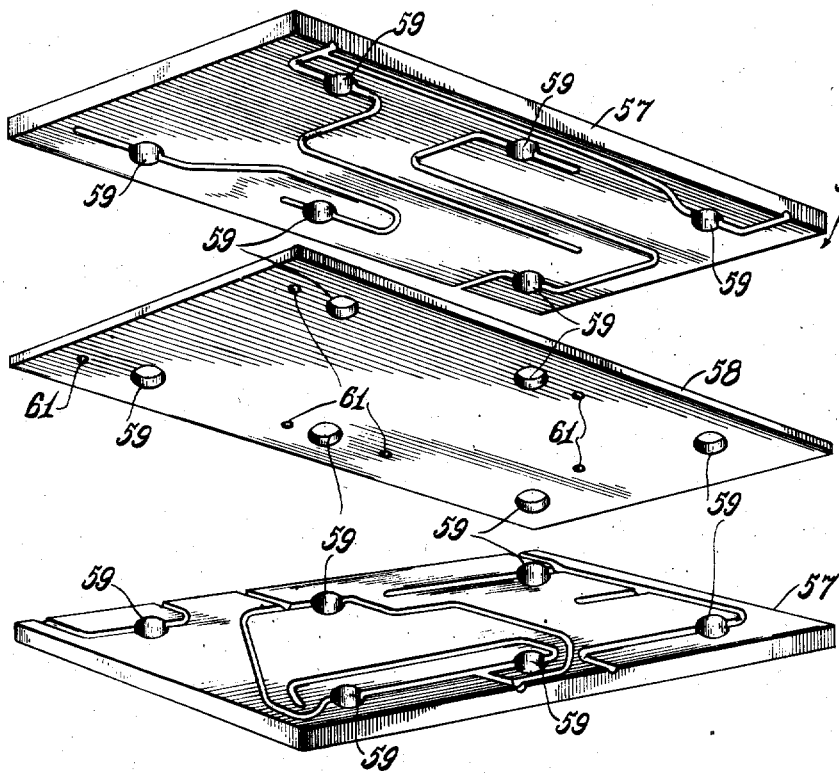
Figure 10 is a disassembled perspective view of the housing into which are slidably mounted the selector valves which partly control the selection of the various gears.
Figure 13:
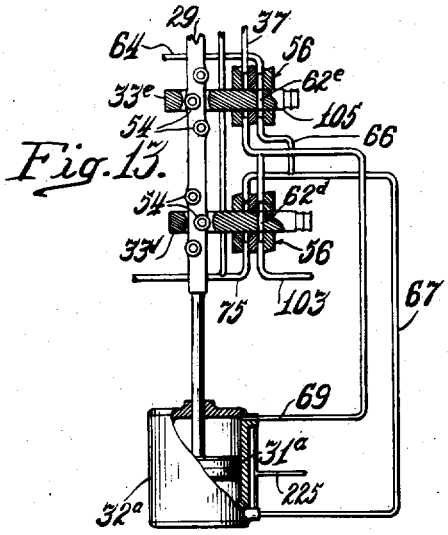
Figure 13 is a fragmental diagrammatic view similar to that shown in Fig. 12, but showing the piping arranged for operation of the gear shift with oil or air pressure.
Figure 11:
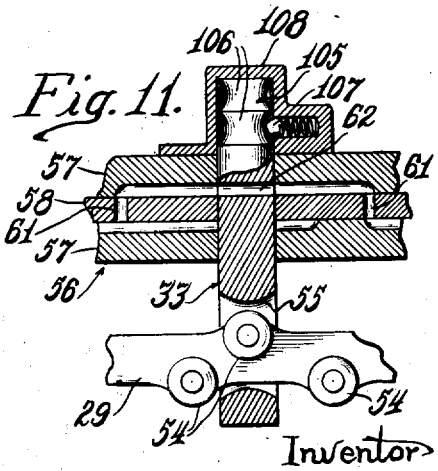
Figure 11 is a detail vertical sectional view through one of the selector valves.

As shown in Figs. 13 and 14 the pipe lines 67 and 69 leading to the ends of the cylinder 32a have been reversed to permit actuation of the piston 31a therein. The diagrammatic view of this hookup is better shown in detail in Fig. 14, wherein the device for creating the pressure required for the operation of the pistons is shown. In this figure the clutch pedal 42 is operatively connected by a link 215 to a bell crank lever arm 216. This lever arm extends into a container 217 and is pivotally connected at its end to a piston rod 218 which piston rod carries a piston (not shown) adapted for reciprocation in a cylinder 219.

The pipe line 221 leading from the cylinder 219 is adapted to replace the vacuum pipe line 52 leading into the master valve 41. It will be seen from the foregoing that upon depression of the clutch pedal 42 the piston forces oil or air, as the case may be, in the cylinder 219, forcing said oil or the air therefrom through the predetermined pipe lines to the proper end of the cylinder to be actuated.

Of course, when the piston 31a is moved in one direction or the other, means must be provided for relieving the pressure on the opposite side. Referring to the drawings, it will be noted that a pair of oppositely disposed valves are provided adjacent the inlet ports of the cylinders. These valves, 222 and 222a are each rigidly mounted on opposite ends of a connecting rod 223, said rod being of such length that only one valve may seat at a time. Therefore, with pressure being applied on the forward side of the piston 31a, through the pipe line 69, valve 222 is forced onto its seat, thereby opening valve 222a and, as the check valve 224a, provided in each of the pressure inlet lines 67 and 69, is urged against its seat, relief for the pressure in the rear side of the piston 31a is provided. When oil is used, a return line 225 leads from each of the relief valves 222 and 222a to the upper end of the container 217, from where it is again forced into the system by the piston and cylinder 219. The return line for oil is dispensed with when using air pressure, as the exhaust air is discharged to the atmosphere.

When pressure is applied to the opposite side of the piston 31a through pipe 67 the reverse action of the valves 222 and 222a takes place, the valve 222a closing and the valve 222 opening.

In the form of the gear shift shown in Figures 15 to 24 inclusive, an electrically operated means is employed whereby upon depression of the clutch pedal 42 the various gears are shifted to their respective positions, automatically the same as has been obtained by the use of the vacuum automatic gear shift previously described.

In this embodiment of the invention, the usual gear shift housing cover is removed and an electric switch box 132 installed in the place thereof. A plurality of selector switches 133 are mounted therein, which are adapted to be actuated by the sliding of the shift rods 25 and 26, said rods having a plurality of notches 134 arranged thereon in suitable predetermined positions, adapted to engage the stems 135 of the respective switches causing same to be moved into or out of contact depending on the gear to be shifted.

Upon closing various circuits in the system, one or more of the solenoids 136, mounted in substantially rectangular housings 137 are energized. Two such housings are employed, one being disposed on each side of the transmission casing. When a predetermined solenoid 136 is energized, one of a plurality of pawls 138 associated therewith and pivotally mounted in the housing 137 is moved into engagement with one or the other of a pair of sliding bars 139, 141 slidingly mounted within each of the housings 137. These bars 139 and 141 extend through the housings 137 and have extensions 142 and 143 respectively, extending forwardly therefrom, which extensions are operatively connected with a rocker arm 144 rigidly secured on the clutch pedal shaft 145 by links 146.

Figure 24:
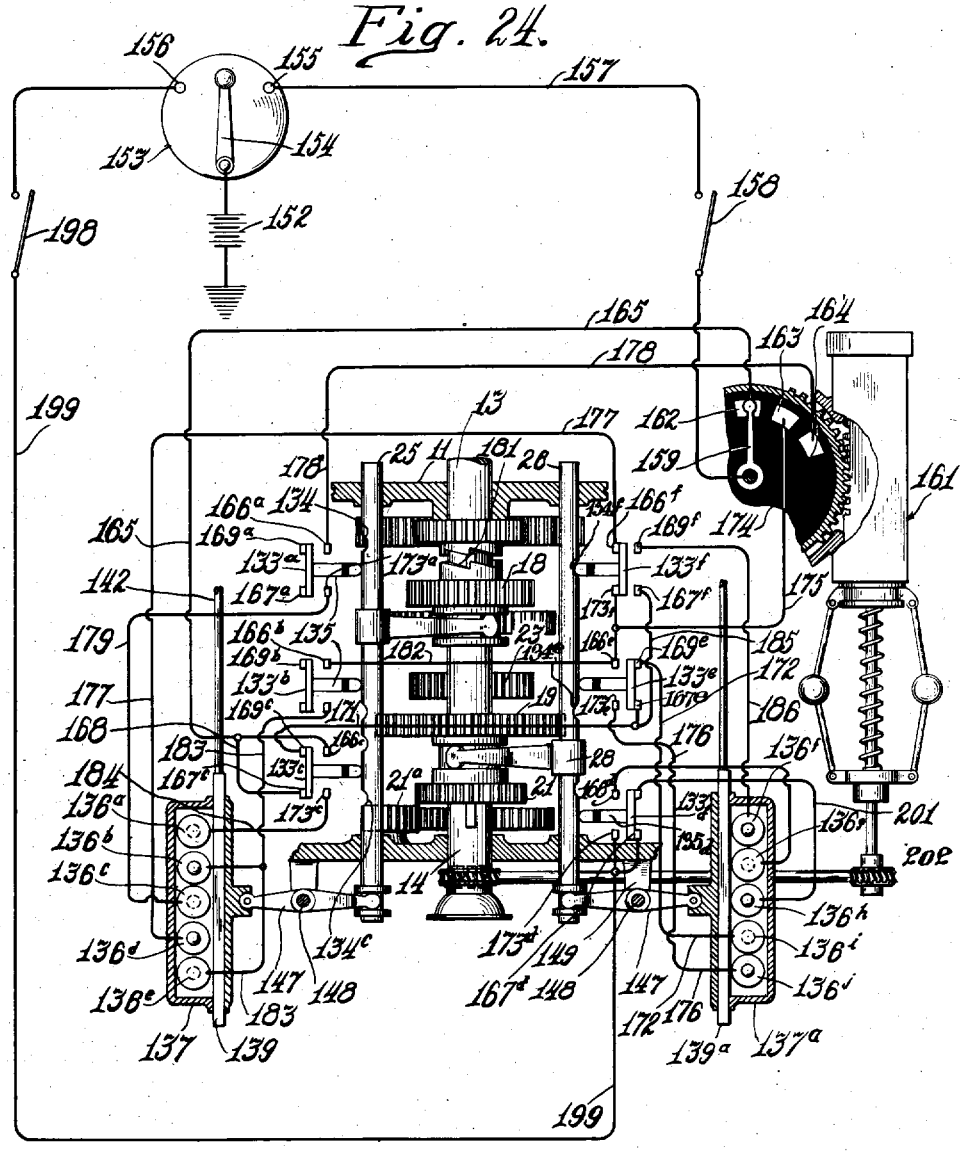
Figure 24 shows the wiring diagram combined with a diagrammatical assembly of the mechanical parts of a transmission.

As shown more clearly in Fig. 24, the housings 137 are operatively connected to the shift rods 25 and 26 by means of bell cranks, 147, pivoted at 148 to a bracket 149 which is secured to the housing 11. It is obvious that upon depression of the clutch pedal 42, the rocker arm 144 is rotated about its center 145 sliding the bars 139 forwardly and causing the bar 141 to move rearwardly. With one of the solenoids 136 energized, holding one of the pawls 138 in operative position, said pawl will engage in one of the notches 151 upon movement of the bars 139 and 141, thus causing the entire housing 137 to be moved in the direction of the bar engaged by said pawl. This will, through the bell crank 147, cause the shift rod associated therewith to move in the proper direction, to move the gears into or out of engagement with their companion gears.

For the purpose of energizing the various solenoids 136, the source of current 152 is connected to a selectively operable master switch 153. The master switch 153 is preferably mounted on the instrument board of the automobile, or if preferred, it may be mounted on the steering wheel thereof, and consists of a pivotally mounted switch arm 154 adapted to have contact with one or the other of a pair of contacts 155 and 156 mounted thereon.

When a selection of gears is desired for driving forward, the switch arm 154 is moved into contact with the contact 155, permitting the electric current to pass from the battery 152 through the switch 153, conduit wire 157 and through a switch 158 operable by the clutch pedal, to the contact arm 159 of a governor 161. The governor 161 is similar in operation to that used in connection with the vacuum controlled gear shifting mechanism, except, that upon an increase in the speed of the driven shaft 14 the governor functions to move various contact points into engagement with the switch arm 159, which contacts determine in part, the selection of the first, second, or third speed gears respectively. The contact 162 connecting the source of current, through the contact arm 159 with the solenoid, for shifting the first speed gear; contact 163 for second speed, and contact 164 for third speed.

Immediately upon starting the motor, in the vehicle, contact 162 is moved into engagement with the contact arm 159, permitting current to pass therethrough into the conduit 165 leading to one of the contacts 166c of selector switch 133c. As the switch 133c is now so positioned that the contact 166c is open, the current will pass to the contact 167c thereof through conduit 168, through the switch 133c, contact 169c, through conduit 171, contacts 167e, and 169e of switch 133e, and through the lead wire 172 energizing solenoid 136i. The energization of this solenoid draws the pawl 138i upwardly into engagement with the notch 151i of the bar 141a whereby, upon actuation of the clutch pedal, the solenoid housing 137a moves the shifting rod 26 causing the low speed gear 19 of the transmission to slide into engagement with the gear 23 mounted on the counter-shaft 15 for first speed. Upon movement of the shift rod 26, the switch 133e drops into the notch 134e provided therefor in the shift rod 26, thereby opening the circuit and deenergizing the solenoid 136j, the switch 133e now bridging the contacts 166e and 173e.

As the vehicle increases in speed, the governor rotates the selector disk 174 moving contacts 163 into engagement with the switch arm 159, and upon depression of the clutch pedal once more, the current passes through master switch 153, conduit 157, switch 158, which is again closed by the operation of the clutch, switch arm 159, contact 163, lead 175, contacts 166e and 173e of switch 133e, lead wire 176. This energizes the solenoid 136j, pulling the pawl 138j into operative engagement with the notch 151j, of the shift rod 139a, whereby movement of the housing 137a, is effected through said rod, to bring the low speed gear 19 out of engagement with the gear 23.

However, while the above is taking place current also passes from the conduit 175, through contacts 173f and 166f, of switch 133f, and through conduit 177, energizing solenoid 136d to move pawl 138d into engagement with the notch 151c of the bar 139. The bar 139 being moved in unison with the bar 139a, moves the housing 137 to slide the shift bar 25 rearwardly carrying the gear 18 into mesh with the gear 22 mounted on the countershaft 15 for driving the car in second speed.

Upon each release of the clutch pedal 42, the switch 158 is opened, thereby interrupting the current passing therethrough, and so preventing the gears, upon rotation of the governor actuated disk 174, from being disengaged or engaged prematurely.

As the vehicle continues to increase in speed, the governor actuated disk is again partially rotated, moving the contact 164 into engagement with the contact arm 159. Upon depression of the clutch pedal the electric current will pass through the lead wire 178, contact 166a, of switch 133a which is now in indented position, contact 173a and through lead 179 to solenoid 136c. Further depression of the clutch pedal 42 moves the rod 25 forwardly, moving the gear 18 out of mesh with the gear 22, through neutral position and causing the clutch member 181, carried thereon, to engage the companion clutch member on the drive shaft 13. The gears are now in position for driving in high speed.

If, owing to the application of the brakes, or increase of the load by traveling uphill, or the like, the speed of the vehicle is reduced, another actuation of the clutch pedal 42 again automatically varies the relation of the change speed gear for second speed, since at that time, owing to the operation of the governor 161, the contact 163 is again moved into contact with the arm 159. The circuit thus established passes from this contact through lead wire 175, contact 166e, lead 182, contacts 166b and 173b of switch 133b, which is now detented, and through lead line 183 thus energizing the solenoid 136e. Further depression of the clutch pedal disengages the clutch 181 and moves the gear 18 back into mesh with the gear 22.

Upon further decrease of speed, the governor 161 again shifts the contact disk, moving the contact 162 into engagement with the contact arm 159 and, upon depression of the clutch pedal the following circuit is immediately established: From the battery 152 the current passes through switch 153, lead 157, clutch actuated switch 158, which is again closed, governor 161, lead 165, through contacts 166c and 173c, which are now closed by the switch 133c, lead 184, energizing solenoid 136a. This permits the shift rod 25 to slide forward moving the gear 18 out of mesh with the gear 22. Immediately upon the movement of the shift rod 25, the switch 133c is moved outwardly due to disengagement with the notch 134c on said rod, thereby closing the circuit between contacts 167c and 169c through conduit 171 to switch 133e, the contacts 167e and 169e thereof being bridged, the current then continuing through the lead line 172 to the solenoid 136i thus energizing same. This solenoid actuates the pawl 138i, causing same to engage the rod 141a, whereby further depression of the clutch pedal 42 moves the low speed gear 19 into engagement with the gear 23 carried on the counter shaft 15.

With the gears now in low speed engagement, the switch 133f is out of engagement with the notch 134f on the rod 26, closing the gap between contacts 169f and 167f, whereby upon depression of the clutch pedal 35, the current passes through the governor switch, lead 165, contacts 167c and 169c of the switch 133c, leads 171, 185, through switch 133f and the lead wire 186 to the solenoid 136f. Further depression of the clutch pedal moves the bar 139a forwardly, carrying the housing 137a therewith, through engagement with the pawl 138f, thereby moving the shift rod to carry the gear 19 out of mesh with the gear 23. Inasmuch as the first speed gear 19 and the reverse gear 21 are both actuated by the shift rod 26, it is necessary, to prevent the reverse gear from being moved into engagement, that the movement of said shift rod be checked before the completion of the depression stroke of the clutch pedal 42.

To this end a slip clutch arrangement is provided on the bar 139a whereby further movement of said bar renders the engagement of the pawl 138f ineffective. This is obtained by providing the notch 151f in an independently mounted block 187 which is adapted to be mounted in a recess 188 provided therefor on the upper side of the shift bar 139a. The block 187 is normally held in rigid engagement therewith by means of key 189, which key engages in a slot 191 provided in the block, it is being retained therein by means of a compression spring 192. The key 189 is provided with a pair of outwardly extending ears 193 which are adapted to engage a cam surface 194 provided therefor on a pair of arms 195 which extend parallel with the bar 139a and on each side thereof. This cam surface is rigidly held in position by a mounting bracket 196 which is secured to the transmission housing. When the shift bar 139a moves rearwardly, the ears of the key 189 will engage the cam surface 194 thereon, thereby drawing the key out of engagement with the said block 187 and permitting the bar to slide independently of the housing 137a. A compression spring 197, mounted between the shoulder of the recess 188 and the block 187, will return the latter to its normal locked position upon the return movement of the bar.

With the gears in their neutral position, automatic shifting into reverse speed may be obtained. To this end it is necessary to move the contact arm 154 of the master switch 153 into engagement with the contact 156, thus closing the circuit between the battery 152 and the contact 156, permitting the current to pass through a second clutch operated switch 198, through lead 199, contacts 167d and 169d of switch 133d, lead wire 201, thereby energizing solenoid 136h. This will draw the pawl 138h into engagement with the notch 151h of the slide bar 139a, whereby upon movement of said bar the shift rod 26 is drawn rearwardly carrying the gear 21 into engagement with the reverse idler gear 21a.

Movement of the rod 26 permits the stem portion 135d of the switch 133d to drop into the notch provided therefor on said rod, thereby closing the circuit between the contacts 166d and 173d thereof, so that upon depressing the clutch pedal again, the current passes through the lead 199, contacts 173d and 166d, and through conduit 202 to solenoid 136g. The pawl 151g, actuated thereby, now engages the rod 141a, whereby the housing 137a is moved, carrying the shift rod 26 forward, moving the gear 21 out of mesh with the idler gear 21a, thus placing the gears in neutral position once more.

Figure 22:
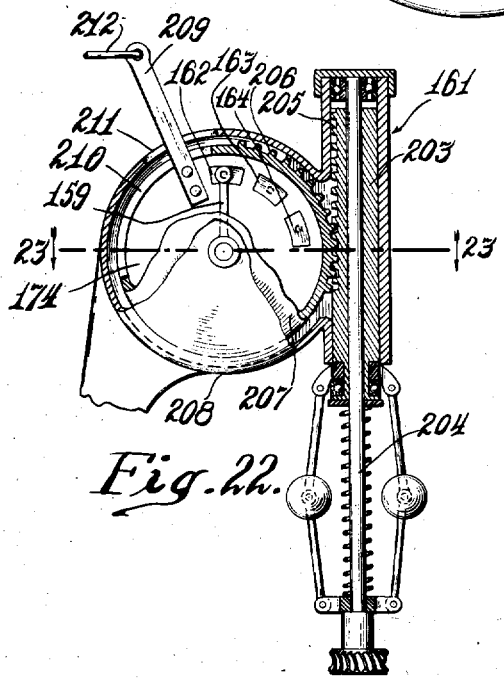
Figure 22 is a sectional elevational view of the governor employed in the electrically operable gear shifting means.
Figure 23:
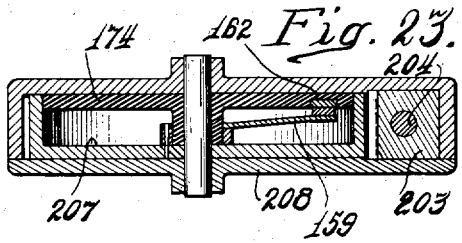
Figure 23 is a detail sectional plan view taken on line 23—23 of Fig. 22.
Figure 18:
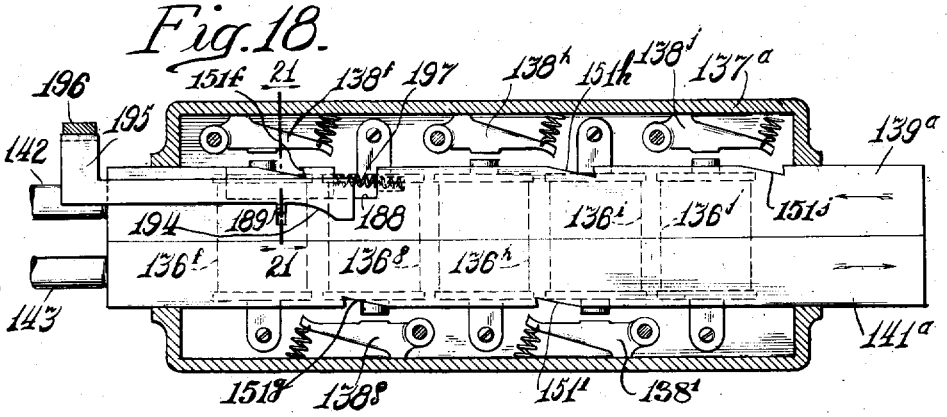
Figure 18 is a vertical sectional view of one of the housings containing the electrically operated gear shifting means, looking outwardly.
Figure 19:
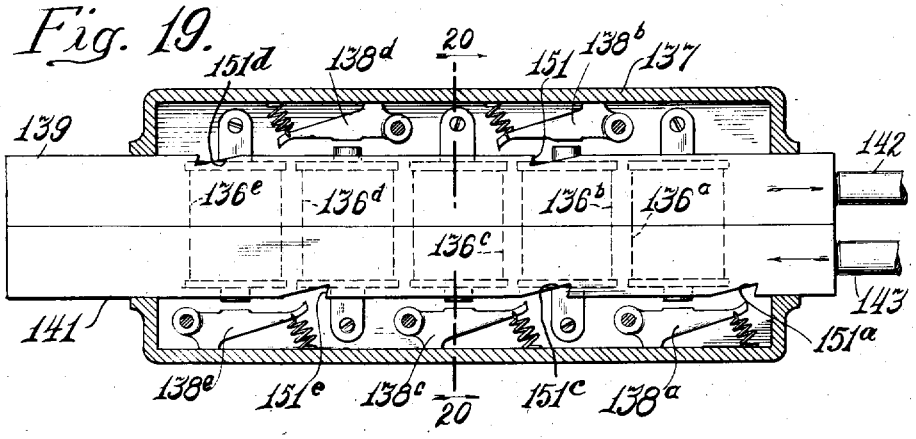
Figure 19 is a view similar to Fig. 18 but showing the other housing.
Figure 20:
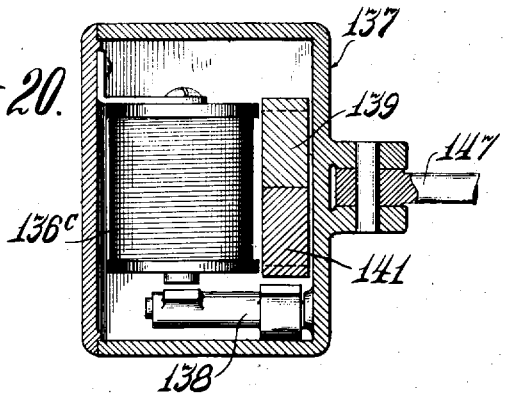
Figure 20 is a vertical sectional view through one of the gear shifting housings, taken on line 20—20 of Fig. 19.
Figure 21:
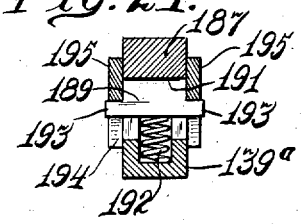
Figure 21 is a detailed sectional view through a slip arrangement employed in the electrically operable gear shifting means contained in the housing shown in Fig. 18, taken on line 21—21 of Fig. 18.

It will be noted from the details of the governor, as disclosed in Figures 22 and 23, that the rack bar 203 carried on the rotary shaft 204 has teeth 205 provided on one face thereof which are adapted to engage teeth 206 on the periphery of a rotatable member 207 provided in the governor housing 208. The contacts 162, 163 and 164 are preferably mounted on the rotatable disk 174 of insulating material, which may be manually rotated to assume various positions of adjustment within the rotary member 207 by means of a lever arm 209 which extends therefrom through the slots 210 and 211 in the inner and outer housings respectively. This lever is adapted to be operatively connected to a control, preferably located on the dash by means of a link 212 whereby, upon manipulation of said dash control, the relative speed of the vehicle, at which the shifting of the gears is to be effected may be adjusted to suit the user.

Figure 25:
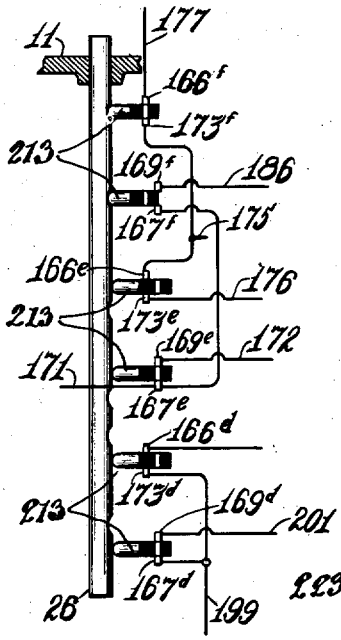
Figure 25 is a detail diagrammatic view of one of the shift rods operating a plurality of switches, or valves, as may be applied to the electrically operable shifting means shown in Fig. 24.

In Fig. 25, I have shown a plurality of switches 213, each having a pair of contacts thereon adapted to open and close the various circuits. If desirable, these switches 213, may be substituted for the selector switches 133 employed in the device shown in Fig. 24. These single circuit switches are so arranged and wired with the remainder of the circuit that their actuation results in closing the same circuits as those closed by the switches 133, they being employed only in the event independent switches are desired.

This electrically operable gear shifting device will operate with the ordinary battery which is installed on all power vehicles, and the strain imposed on the battery by this device is very small, partly because the battery is called on intermittently only to supply current for the electrical change speed gears and partly because the current required for energizing the electromagnets does not have to be of great intensity.

The solenoids have the function solely of placing the associated pawls into operative engagement with the various slide bars, the pawls absorbing the strain of the movement therethrough.

It will be noted that the selector switches employed in effecting the change in speed by directing the current through different circuits, also act upon the shift rods to lock them in their respective positions.

It is also apparent that the ordinary gear shift lever 131 (Figs. 1 and 15) may remain in association with the entire transmission, so that any substantial alteration in the change speed gears of known construction is not necessary, but may be used in connection with these various automatic gear shifting devices herein described if desired, or the gear shift lever may be detachable and carried like a starting crank for emergency use.

When using the ordinary gear shift lever 131, the manipulation thereof requires considerable practice on the part of the operator, and also in the case of automatic gear shifts wherein a plurality of buttons are so arranged, preferably on the dash, whereby upon manipulation of these buttons, the change of the various speed gears is effected, it also requires considerable practice before they can be operated with safety. The present change speed gear device does not call for any experience on the part of the operator, and as the driver instinctively depresses the clutch pedal, the change from higher to lower gear, or vice versa is effected whenever this is required. A change from any speed to another speed is effected herein in proper sequence, and a change from a lower to a higher speed, where the inverse change is necessary, can not take place.

It is also obvious that in this device none of the gears pass from one state to another without an intermediate neutral condition, and hence the danger of stripping the gears which may take place in ordinary gear shift, is entirely avoided. Inasmuch as the vacuum or oil pressure utilized for operating this device is already present in the motor of the vehicle, it is unnecessary to provide additional equipment whereby this vacuum may be obtained.

Weather conditions will not detrimentally affect the operation of the device, so that even in severe cold weather, or extremely warm weather, the shifting of the gears may be made from any desired position in accordance to the state of the vehicle.

I claim:

1. In a change speed gear transmission of the type in which two shift rods are individually associated with sets of shiftable gears, a piston carried on the end of each shift rod, a plurality of selector valves operable by the shift rods, an operator controlled element, a source of fluid pressure controlled by the operator controlled element for actuating the pistons, and a speed controlled element for determining the piston to be actuated and the direction of its movement.

2. In a change speed gear transmission of the type in which two shift rods are individually associated with sets of shiftable gears, an operator controlled element, a piston carried on the end of each shift rod, a plurality of selector valves operable by the shift rods, a speed controlled element, said plurality of valves and the speed controlled element determining the piston to be actuated and the direction of its movement upon actuation of the operator controlled element.

3. In a change speed gear transmission of the type in which two shift rods are individually associated with sets of shiftable gears, a piston carried on the end of each shift rod, a clutch pedal, a source of fluid pressure controlled by the clutch pedal for actuating said pistons, and a speed controlled means associated therewith whereby the selection of the piston to be actuated is automatically effected.

4. In a change speed gear transmission of the type in which two shift rods are individually associated with sets of shiftable gears, means on said shift rods for actuating a plurality of selector valves, a piston on each shift rod, a clutch pedal, a source of fluid pressure controlled by the clutch pedal for actuating said pistons, a speed controlled means associated with the plurality of selector valves whereby the selection of the piston to be actuated is automatically effected.

5. In a change speed gear transmission of the type in which two shift rods are individually associated with a set of shiftable gears, a plurality of rollers on said shift rods, a plurality of valves actuated by and operatively associated with said rollers, a piston on each shift rod, a clutch pedal for effecting the actuation of said pistons, and a speed controlled valve associated with the plurality of valves whereby the selection of the piston to be actuated is automatically effected.

6. In a gear shifting mechanism for a change speed gear transmission of the type in which shiftable sets of gears are individually associated with gear shift rods, a piston on each of said rods for displacing them longitudinally, means for actuating said pistons, said means being under the control of the operator, a speed actuated means for determining which of said pistons is to be actuated, and means for automatically lubricating said gear shifting mechanism.

7. In a change speed gear transmission of the type in which two shift rods are individually associated with a set of shiftable gears, a source of fluid pressure, a clutch pedal, means on said shift rod for actuating a plurality of selector valves operatively associated therewith, a piston on each shift rod, a master valve operable upon manipulation of the clutch pedal for controlling the application of fluid pressure for actuating said pistons, and a speed controlled means associated with said plurality of selector valves whereby the selection of the piston to be actuated is automatically effected.

8. A change speed gear transmission having a plurality of shiftable gears, in combination with a clutch pedal, a vacuum actuated means controlled by the pedal for shifting the gears to different positions, and means actuated by said vacuum whereby the vacuum system is automatically lubricated.

9. In a change speed gear transmission having a driven shaft associated with a governor, and having sets of slidable gears, a clutch pedal, a plurality of selector valves associated with said governor for determining the selection of the set of gears to be shifted, a master valve, means for operating said master valve upon depression of the clutch pedal and an operator controlled means for adjusting the position of said master valve for varying the selection of the gear to be shifted.

10. A change speed gear transmission having a plurality of shiftable gears in combination with a clutch pedal; a vacuum system including means controlled by the clutch pedal for shifting the gears to different positions; and means for automatically lubricating said vacuum system.

11. In a change speed gear transmission of the type in which shiftable sets of gears are individually associated with shift rods; a vacuum system including pistons associated with the shift rods for displacing said rods longitudinally; means for actuating said pistons; a valve under control of the operator for controlling said means; a speed actuated valve for determining which of said pistons is to be actuated, and means associated with said pistons for automatically lubricating the vacuum system.

12. In a change speed gear transmission of the type in which shiftable sets of gears are individually associated with shift rods; a vacuum operated system for displacing said rods longitudinally; and means actuated by the vacuum for lubricating the vacuum operated system.

13. In a change speed gear transmission of the type in which shiftable sets of gears are individually associated with shift rods; a vacuum operated system for displacing said rods longitudinally; an operator controlled element for controlling said vacuum operated system, and means operable by the vacuum for lubricating the vacuum operated system.

14. In a change speed gear transmission of the type in which shiftable sets of gears are individually associated with shift rods, a vacuum operated system for displacing said rods longitudinally to shift the gears, said system comprising a cylinder and its piston connected to a rod, and means operated by the vacuum for drawing oil vapor into the cylinder.

15. In a change speed gear transmission of the type in which shiftable sets of gears are individually associated with shift rods, a vacuum operated system for displacing said rods longitudinally, said system comprising a double acting cylinder and its piston connected to a rod, and means operated by the vacuum for drawing oil vapor into both ends of said cylinder as the piston moves to and fro.

16. In a change speed gear transmission of the type in which shiftable sets of gears are individually associated with shift rods, a vacuum operated system for displacing said rods longitudinally, said system comprising a source of suction, a cylinder and its piston connected to a rod, piping connecting said cylinder and source of suction, valves in said piping, and means operated by the vacuum for drawing oil vapor into said cylinder and valves.

17. In a change speed gear transmission of the type in which shiftable sets of gears are individually associated with shift rods, a vacuum operated system for displacing said rods longitudinally, said system comprising a source of suction, a double acting cylinder and its piston connected to a rod, piping connecting both ends of said cylinder and source of suction, valves in said piping to control the movements of the piston, and means operated by the vacuum for drawing oil vapor into both ends of said cylinder and into said valves as the piston moves to and fro.

18. In a motor vehicle change speed gear transmission of the type in which two shift rods are individually associated with sets of shiftable gears, a vacuum operated system for moving said rods longitudinally comprising a piston carried on each rod, cylinders for the pistons, a clutch pedal, a valve operable by the clutch pedal for controlling the application of vacuum for actuating said pistons, a governor, a selector valve controlled by the governor, and piping from said selector valve to said cylinders.

19. In a motor vehicle change speed gear transmission of the type in which two shift rods are individually associated with sets of shiftable gears, a vacuum operated system for moving said rods longitudinally comprising a piston carried on each rod, cylinders for the pistons, a clutch pedal, a valve operable by the clutch pedal for controlling the application of vacuum for actuating said pistons, a governor, a selector valve controlled by the governor, piping from said selector valve to said cylinders, and a plurality of valves in said piping between said selector valve and said cylinders, selectively actuable in predetermined relation to the positioning of the selector valve by the governor.

20. In a change speed gear of the type in which two shift rods are individually associated with sets of shiftable gears, a piston at the end of each shift rod, a cylinder for each piston, a clutch pedal, a source of fluid pressure controlled by the clutch pedal for actuating said pistons, speed controlled means associated therewith whereby the selection of the piston to be actuated is automatically effected, and means for automatically opening an air inlet at one end of a cylinder as the piston moves toward the other end of the cylinder.

21. In a change speed gear of the type in which two shift rods are individually associated with sets of shiftable gears, a piston at the end of each shift rod, a cylinder for each piston, a clutch pedal, suction means controlled by the clutch pedal for actuating said pistons, speed controlled means associated therewith whereby the selection of the piston to be actuated is automatically effected, and a valve operated by suction to admit air at one end of a cylinder as the piston moves toward the other end of the cylinder.

22. In a change speed gear transmission of the type in which shiftable sets of gears are individually associated with shift rods, a vacuum system operated from an intake manifold for displacing said rods longitudinally to shift the gears, said system comprising a cylinder and its piston connected to a rod, and connections from an engine crank case including a valve operated by vacuum to admit oil vapor at one end of a cylinder as the piston moves toward the other end of the cylinder.

23. In a change speed gear transmission of the type in which shiftable sets of gears are individually associated with shift rods, a vacuum operated system for displacing said rods longitudinally, said system comprising a double acting cylinder and its piston connected to a rod, and spring controlled vacuum operated valve means for admitting oil laden vapor into either end of said cylinder when the piston is moving in the opposite direction.

HARRY L. HOY.